United States Patent [19]

Bell

[11] Patent Number: 5,146,953
[45] Date of Patent: Sep. 15, 1992

[54] PIPE SEALING APPARATUS

[76] Inventor: David C. Bell, P.O. Box 3142, Deer Park, Md. 21550

[21] Appl. No.: 723,774

[22] Filed: Jul. 1, 1991

[51] Int. Cl.⁵ ............................................. F16L 55/16
[52] U.S. Cl. ....................................... 138/99; 138/93
[58] Field of Search ............ 29/402.09; 128/DIG. 20; 138/93, 99; 141/17, 19, 329

[56] References Cited

U.S. PATENT DOCUMENTS

| 141,536 | 8/1873 | Bellemere | 138/99 |
|---|---|---|---|
| 158,554 | 1/1875 | Whitcomb | 138/99 |
| 2,616,736 | 11/1952 | Smith | 138/99 |
| 2,850,045 | 9/1958 | Soehnlen | 138/99 |
| 2,865,410 | 12/1958 | Neely | 141/329 |
| 3,043,342 | 7/1962 | Graham | 138/99 |
| 3,480,043 | 11/1969 | Proudfoot | 138/99 |
| 3,496,963 | 2/1970 | Bardgette | 138/99 |
| 4,021,265 | 5/1977 | Guenther | 138/93 |
| 4,026,329 | 5/1977 | Thompson | 138/93 |
| 4,202,379 | 5/1980 | Vetter | 138/99 |
| 4,442,867 | 4/1984 | de Sivry | 138/93 |
| 4,498,604 | 2/1985 | Mackal | 141/329 |
| 4,602,659 | 7/1986 | Parkyn | 138/93 |
| 4,627,470 | 12/1986 | Carruthers | 138/93 |
| 4,671,518 | 6/1987 | Retz | 138/93 |
| 4,826,036 | 5/1989 | Lewis | 138/93 |
| 4,880,035 | 11/1989 | Vetter | 138/99 |
| 4,969,493 | 11/1990 | Lee | 141/329 |
| 5,012,842 | 5/1991 | Savard | 138/99 |
| 5,095,935 | 3/1992 | Blackley | 138/99 |

FOREIGN PATENT DOCUMENTS

| 953337 | 3/1964 | United Kingdom | 141/329 |
|---|---|---|---|
| 985591 | 3/1965 | United Kingdom | 128/DIG. 20 |

Primary Examiner—Philip R. Coe
Assistant Examiner—Terrence R. Till
Attorney, Agent, or Firm—Leon Gilden

[57] ABSTRACT

A pipe sealing apparatus is provided to include an outer arcuate support shell defining an arc equal to or less than one hundred eighty degrees securing an inflatable pneumatic bladder to a concave surface thereof, with the bladder including a flexible polymeric sealing plate mounted thereon in confrontation and in with continuous communication with an associated pipe to be sealed. The apparatus includes an inflation chamber to direct inflation into the bladder as required.

3 Claims, 6 Drawing Sheets

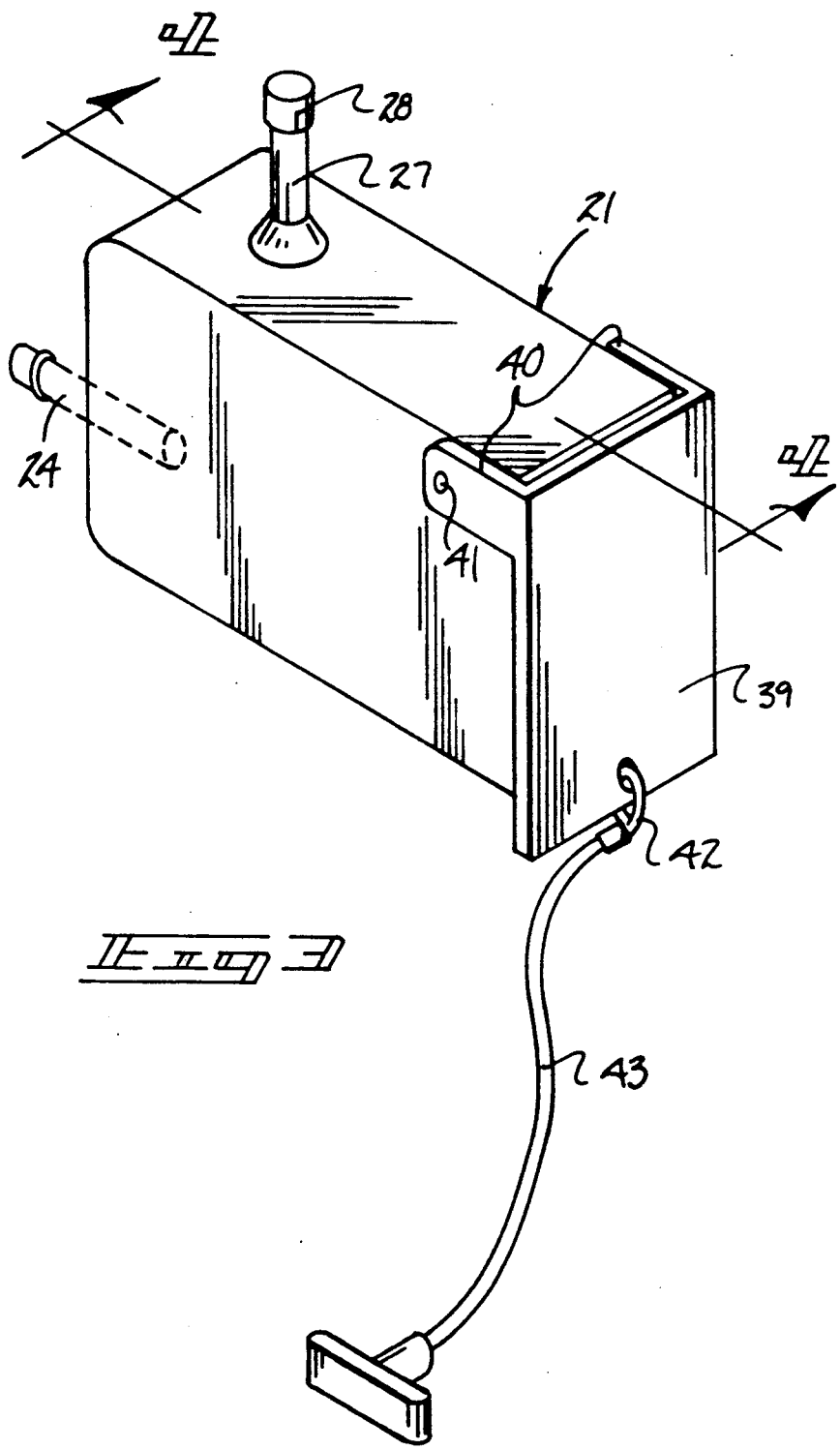

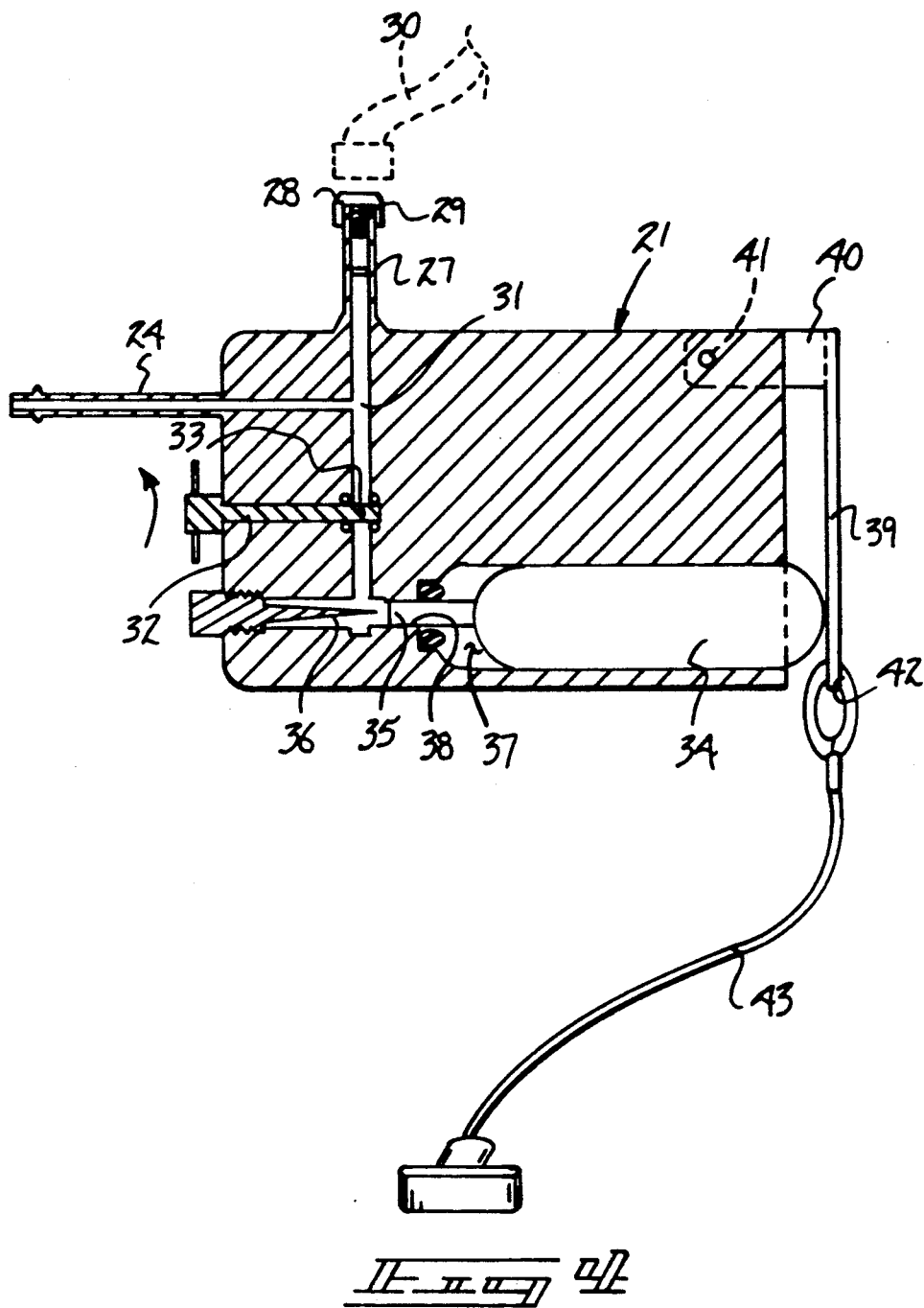

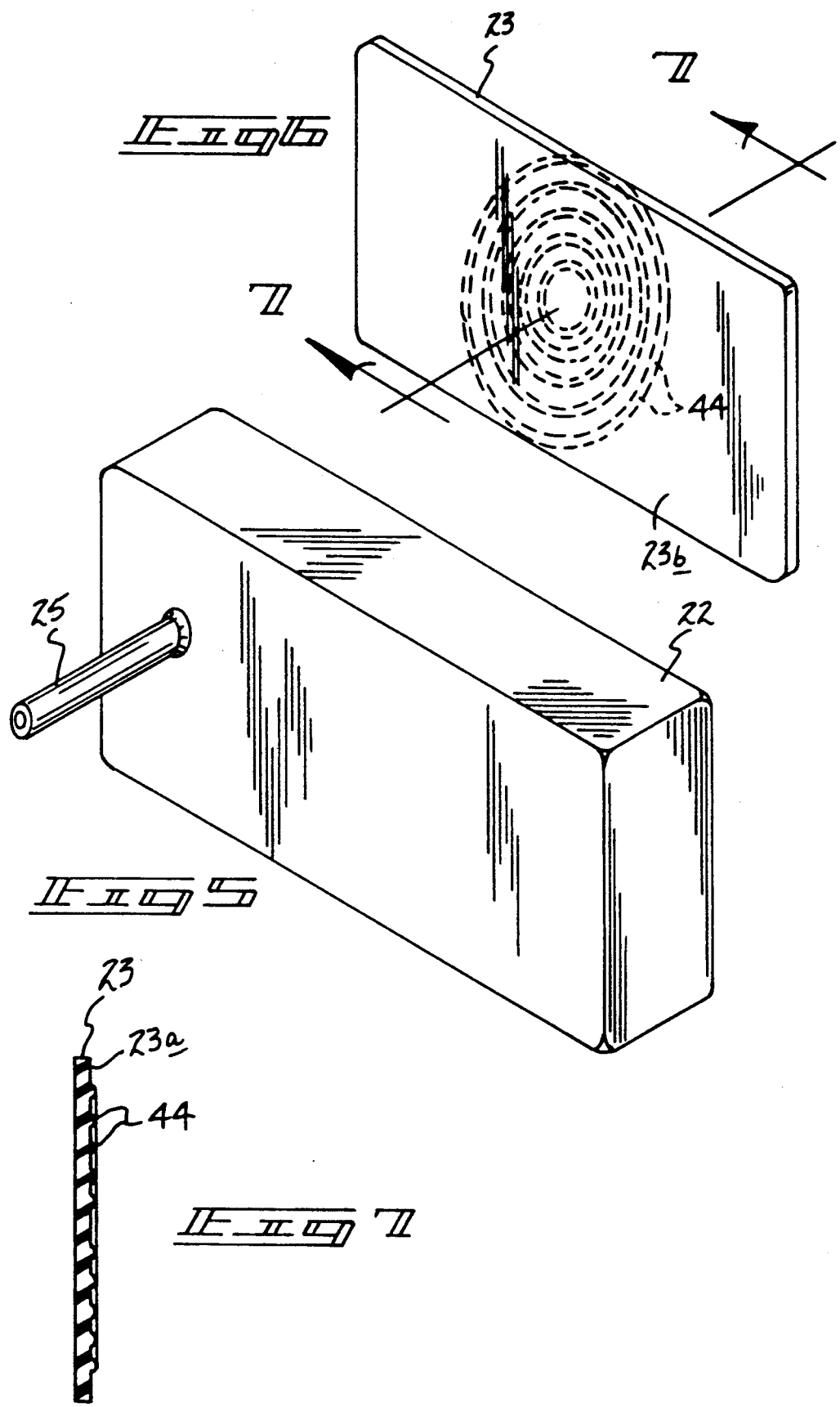

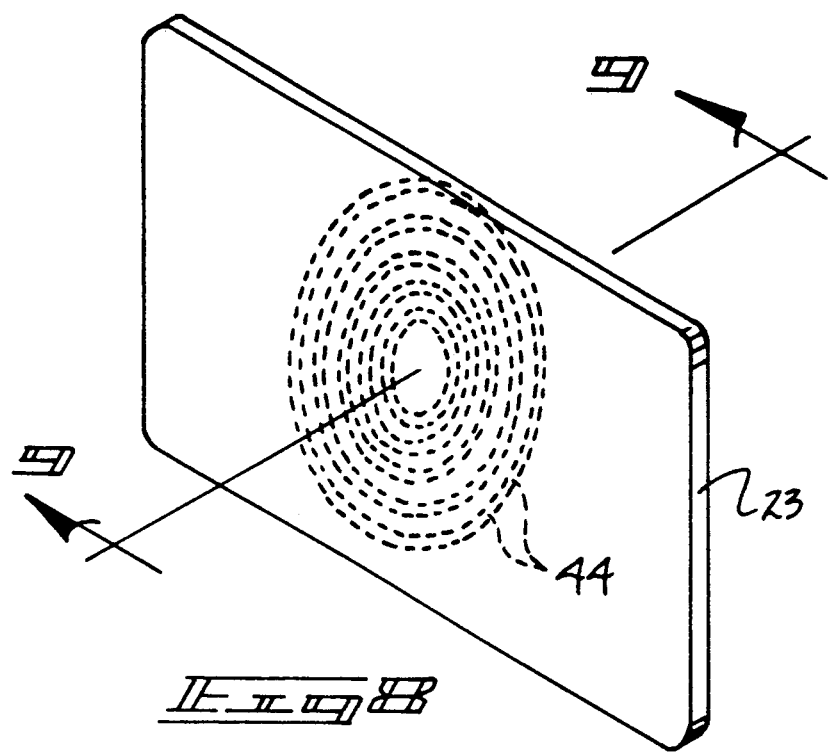
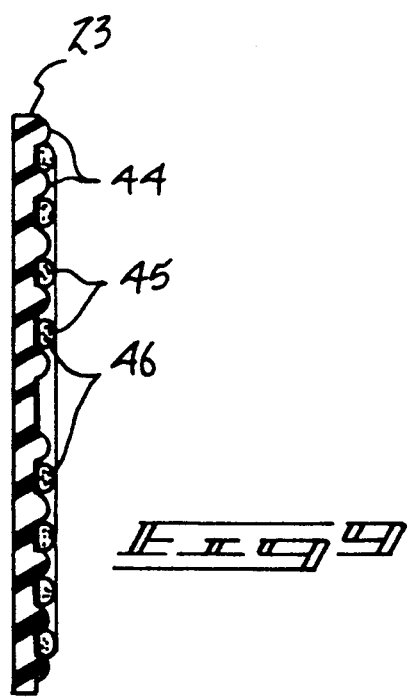

PIPE SEALING APPARATUS

BACKGROUND OF THE INVENTION

1. Field of the Invention

The field of invention relates to pipe sealing apparatus, and more particularly pertains to a new and improved pipe sealing apparatus wherein the same is arranged for selective sealing of cracks and fissures within pipe structure.

2. Description of the Prior Art

The stopping of leaks in pipes of pressures without the abrupt shutting down of an associated system permits commercial, as well as private, temporary repair of such organizations. Prior art structure is exemplified in U.S. Pat. No. 4,826,036 to Lewis, et al. setting forth a nozzle dam sealing inflatable bladders to effect sealing about the nozzle structure.

U.S. Pat. No. 4,602,659 to Parkyn, Sr. sets forth an organization to repair holes and cracks in clay type sewer pipes utilizing an elastomeric sleeve directed interiorly of the pipe structure.

U.S. Pat. No. 4,627,470 to Carruthers sets forth a sealing structure for stopping-off a duct utilizing an inflatable bag.

U.S. Pat. No. 4,671,518 to Rotz sets forth an inflatable plug member positionable within an opening in a vessel.

As such, it may be appreciated that there continues to be a need for a new and improved pipe sealing apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of pipe sealing apparatus now present in the prior art, the present invention provides a pipe sealing apparatus wherein the same utilizes an inflatable bladder to effect sealing to an exterior surface of a pipe structure. As such, the general purpose of the present invention, which will be described subsequently in greater detail, is to provide a new and improved pipe sealing apparatus which has all the advantages of the prior art pipe sealing apparatus and none of the disadvantages.

To attain this, the present invention provides a pipe sealing apparatus including an outer arcuate support shell defining an arc equal to or less than one hundred eighty degrees securing an inflatable pneumatic bladder to a concave surface thereof, with the bladder including a flexible polymeric sealing plate mounted thereon in confrontation with continuous communication with an associated pipe to be sealed. The apparatus includes an inflation chamber to direct inflation into the bladder as required.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pipe sealing apparatus which has all the advantages of the prior art pipe sealing apparatus and none of the disadvantages.

It is another object of the present invention to provide a new and improved pipe sealing apparatus which may be easily and efficiently manufactured and marketed.

It is a further object of the present invention to provide a new and improved pipe sealing apparatus which is of a durable and reliable construction.

An even further object of the present invention is to provide a new and improved pipe sealing apparatus which is susceptible of a low cost of manufacture with regard to both materials and labor, and which accordingly is then susceptible of low prices of sale to the consuming public, thereby making such pipe sealing apparatus economically available to the buying public.

Still yet another object of the present invention is to provide a new and improved pipe sealing apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the inflation housing utilized by the invention.

FIG. 4 is an orthographic view, taken along the lines 4—4 of FIG. 3 in the direction indicated by the arrows.

FIG. 5 is an isometric illustration of the inflatable bladder utilized by the invention.

FIG. 6 is an isometric illustration of the sealing plate utilized by the instant invention.

FIG. 7 is an orthographic view, taken along the lines 7—7 of FIG. 6 in the direction indicated by the arrows.

FIG. 8 is an isometric illustration of a modified sealing plate structure utilized by the instant invention.

FIG. 9 is an orthographic view, taken along the lines 9—9 of FIG. 8 in the direction indicated by the arrows.

DESCRIPTION OF THE PREFERRED EMBODIMENT

Figure 1:
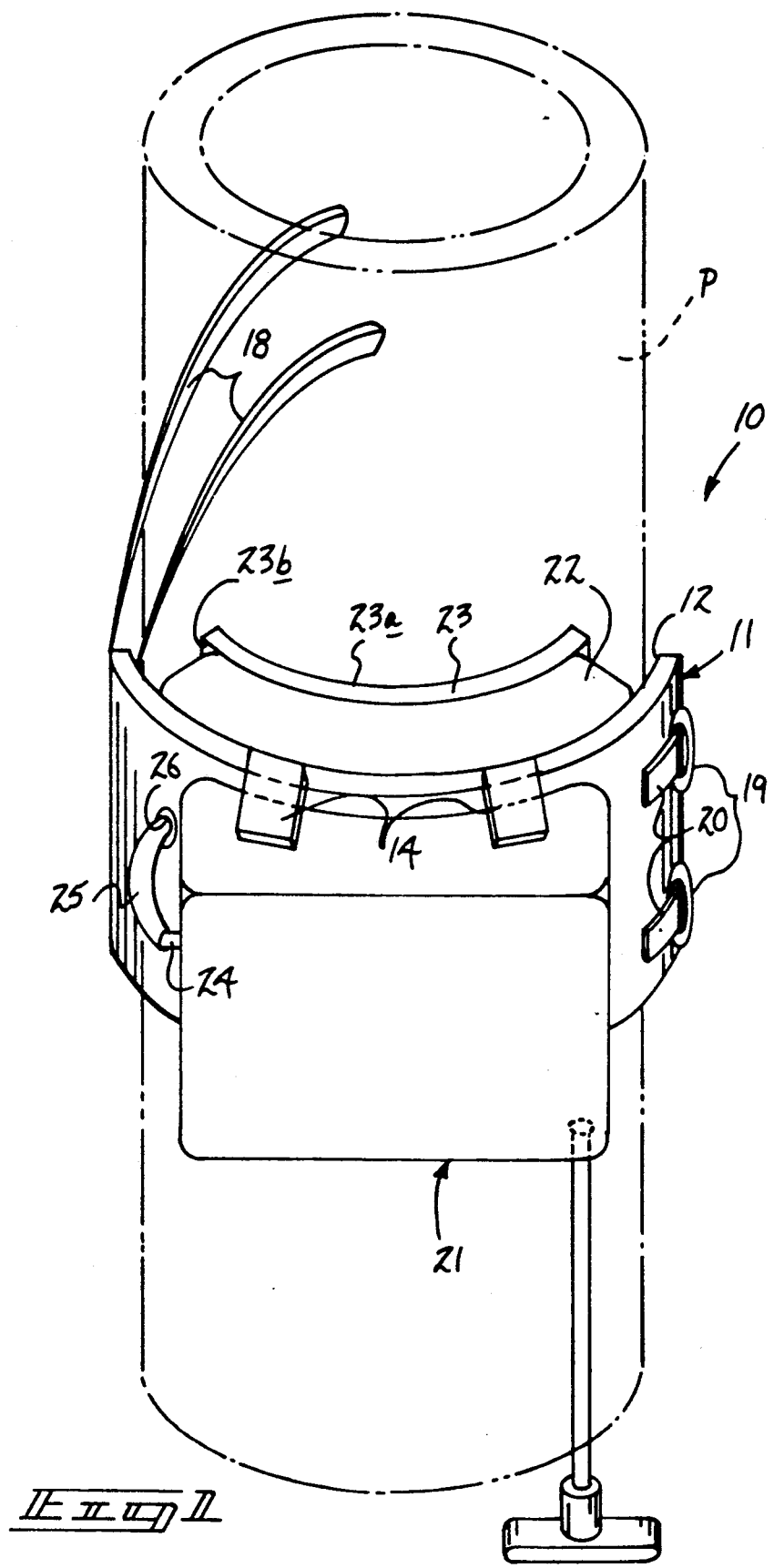
FIG. 1 is an isometric illustration of the instant invention.

With reference now to the drawings, and in particular to FIGS. 1 to 9 thereof, a new and improved pipe sealing apparatus embodying the principles and concepts of the present invention and generally designated by the reference numeral 10 will be described.

Figure 2:
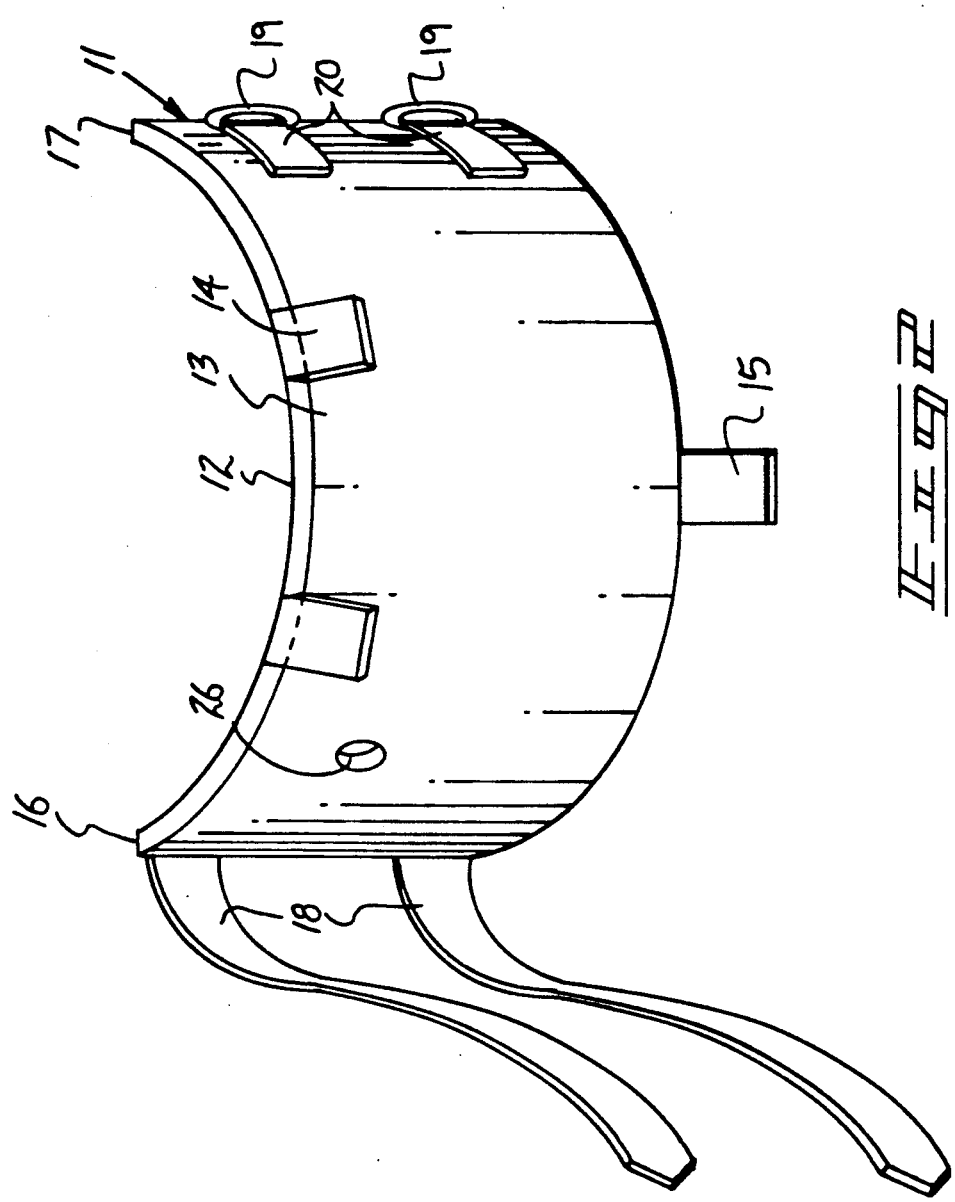
FIG. 2 is an isometric illustration of the mounting plate utilized by the invention.

More specifically, the pipe sealing apparatus 10 of the instant invention essentially comprises a rigid arcuate mounting plate 11 defined by a concave plate interior surface 12 spaced from a convex plate exterior surface 13. The plate 11 defines an arc equal to or less than one hundred eighty degrees for mounting relative to a pipe "P", as illustrated in FIG. 1, to position the mounting plate above a fissure or crack for sealing. The exterior surface 13 includes at least one upper mounting flange 14 spaced from a lower mounting flange 15 for securement of an inflation housing 21 therebetween. The plate 11, as illustrated in FIG. 2, further includes a first end 16 spaced from a second end 17, wherein the first end 16 includes a plurality of flexible securement straps 18 that are directed about the pipe "P" and subsequently through the "D" shaped rings 19 that are spaced apart a spacing and mounted to support loops 20, wherein the rings and straps 18 are spaced apart substantially an equal spacing to permit the temporary securement of the apparatus 10 to the pipe "P".

The inflation housing 21 is operative to effect selective inflation of a pneumatic bladder 22 that is mounted to the concave interior surface 12 of the plate 11. A resilient sealing plate 23 is then mounted to the bladder 22 in a spaced relationship relative to the mounting plate 11. A resilient plate 23 is then deformed to define a concave outer surface 23a and a convex interior surface 23b to effect sealing of the pipe fissure or crack received within the concave outer surface 23a. The inflation housing 21, when mounted to the mounting plate 11, includes an outlet pipe 24, with a directional conduit 25 secured to the outlet pipe 24, then through a mounting plate aperture 26. The directional conduit 25 is in pneumatic communication with the bladder 22 to effect its inflation through the inflation housing 21.

The inflation housing 21, as illustrated in FIGS. 3 and 4, includes an auxiliary inflation tube 27 directed into the housing 21 through a needle valve 29 to permit inflation of an inflation hose 30 applied to the needle valve 29 to impart pneumatic filling of the bladder 22 through the directional conduit 25. Alternatively, a pressurized gas canister 34 is mounted within a canister cavity 37 directed through a rear wall of the housing 21. The gas canister 34 includes a canister web 35 through a neck of the canister that is pierced by a puncture needle 36 mounted through a forward wall of the housing 21. Upon puncturing of the canister 37, filling of the bladder 22 is effected through connecting conduits, wherein a rotary valve shaft 32 includes a shaft bore 33 to permit ninety degree rotation of the valve shaft 32 to direct inflation gas into the directional conduit 25. The gas canister 37 includes a neck that is aligned within a neck receiving bore 38 that is also coaxially aligned with the puncture needle 36, as illustrated in FIG. 4. To effect this puncturing, an actuator plate 39 is pivotally mounted relative to the rear wall of the housing 21 utilizing a plurality of pivot axles 41 pivotally mounting the legs 40 orthogonally mounted to an upper terminal end of the actuator plate 39. A lower end of the actuator plate 39 mounts an actuator cable loop 42 mounted to an actuator cable 43, whereupon yanking of the actuator cable 43 effects directing of the canister web 35 to be pierced by the puncture needle 36.

FIG. 6 illustrates the sealing plate 23 formed with a plurality of concentric sealing ribs 44 mounted to an outer surface 23a of the sealing plate. The concentric ribs enhance sealing of pressurized fluid or gas within the pipe "P". Further, the ribs 44 (see FIG. 9) may include annular capsules 45 positioned between adjacent ribs, with each of the capsules including a fluid adhesive 46 that is ruptured to enhance sealing of the sealing plate 23 to the exterior surface of the pipe "P".

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pipe sealing apparatus for securement to an exterior surface of an associated fluid directing pipe, the apparatus comprising, a rigid arcuate mounting plate, the mounting plate including a concave plate interior surface spaced from a concave plate exterior surface, and a first edge spaced from a second edge, the first edge including at least one flexible securement strap for securement about the pipe, and the second edge including at least one support loop, the at least one support loop includes a "D" shaped ring to receive the flexible securement strap therethrough for securement about the pipe, and the concave interior surface including an inflation bladder fixedly mounted to the interior surface, and the convex exterior surface including an inflation housing means for effecting selective inflation of the bladder, the bladder including a flexible sealing plate, the flexible sealing plate mounted to the bladder in spaced relationship relative to the concave plate interior surface for contiguous communication with the pipe, and the inflation housing means includes a housing rear wall and a housing forward wall, the inflation housing means further including a top wall, the inflation housing means including a canister cavity, the canister cavity slidably receiving a pressurized gas canister therewithin, the canister cavity including a neck receiving bore, and the gas canister including a gas canister neck slidably received within the neck receiving bore, and the canister cavity directed through the housing means rear wall, and the housing means forward wall including a puncture needle directed therethrough in coaxially aligned communication with the neck receiving bore adjacent the gas canister neck, and an outlet pipe directed through the inflation housing means exteriorly thereof in pneumatic communication with the neck receiving bore, and a rotary valve in pneumatic communication between the outlet pipe and the neck receiving bore, with the rotary valve including a rotary valve bore means for selective stoppage of pneumatic gas from the neck receiving bore to the outlet pipe, and an auxiliary inflation tube in pneumatic communication through the inflation housing means and the outlet pipe, with the auxiliary inflation tube including a needle valve directed therewithin for receiving pressurized gas through the needle valve into the auxiliary inflation tube and the outlet pipe, and the outlet pipe in pneumatic communication with the directional conduit, the directional conduit directed through a mounting plate aperture directed through the mounting plate.

2. An apparatus as set forth in claim 1 wherein the sealing plate formed of a flexible material includes a convex interior surface in contiguous communication with the inflation bladder, and a sealing plate concave outer surface spaced from the convex interior surface for communication with the pipe, the concave sealing plate outer surface including a plurality of concentric flexible sealing rings.

3. An apparatus as set forth in claim 2 wherein adjacent sealing rings include an annular capsule directed coextensively therebetween, wherein the annular capsule includes a fluid adhesive contained therewithin for rupturing upon pressurizing the pneumatic bladder.

* * * * *